Oct. 14, 1924.
V. W. PAGÉ
1,511,631
MOTOR CYCLE FRAME
Filed Dec. 26, 1922    2 Sheets-Sheet 1
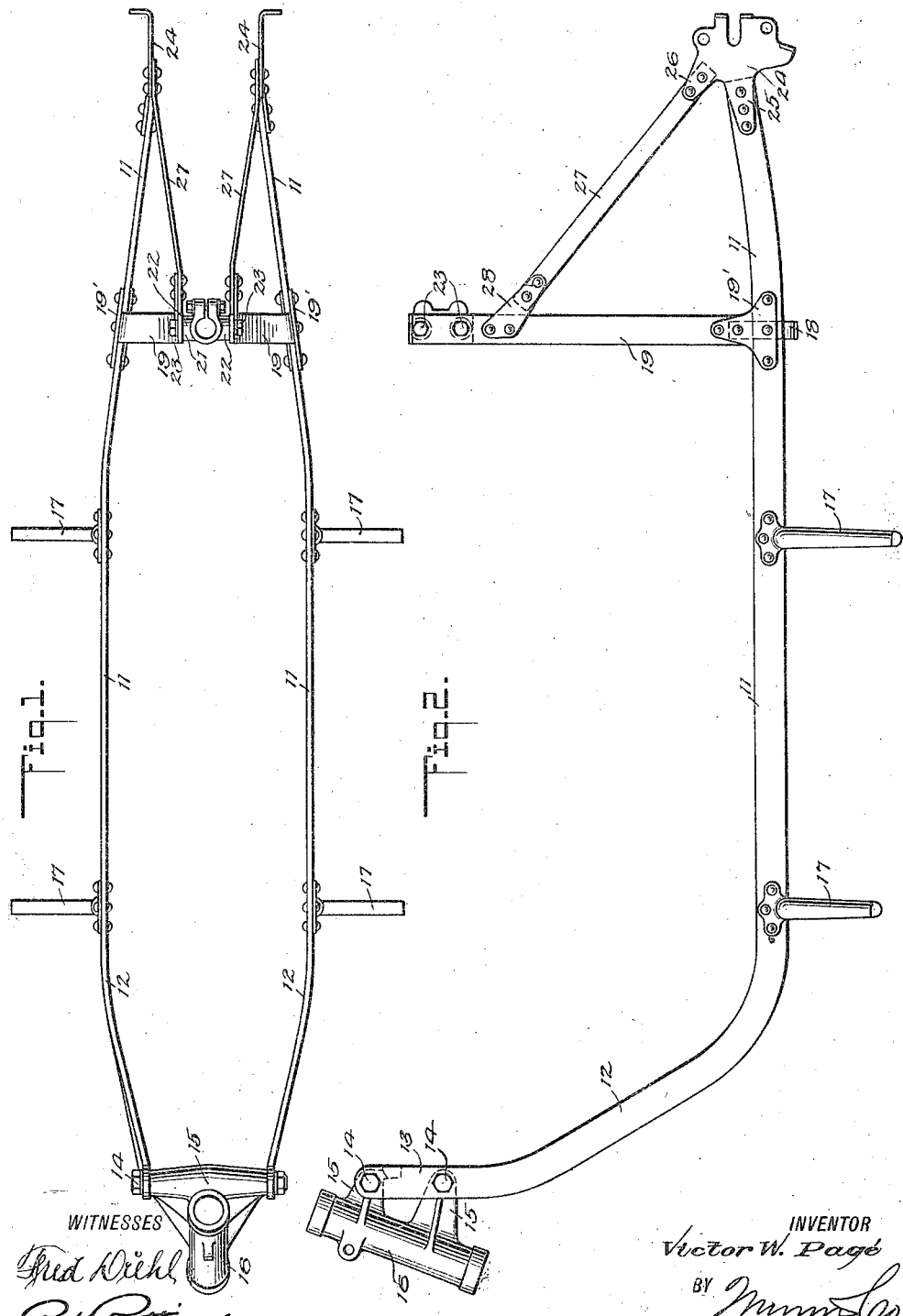

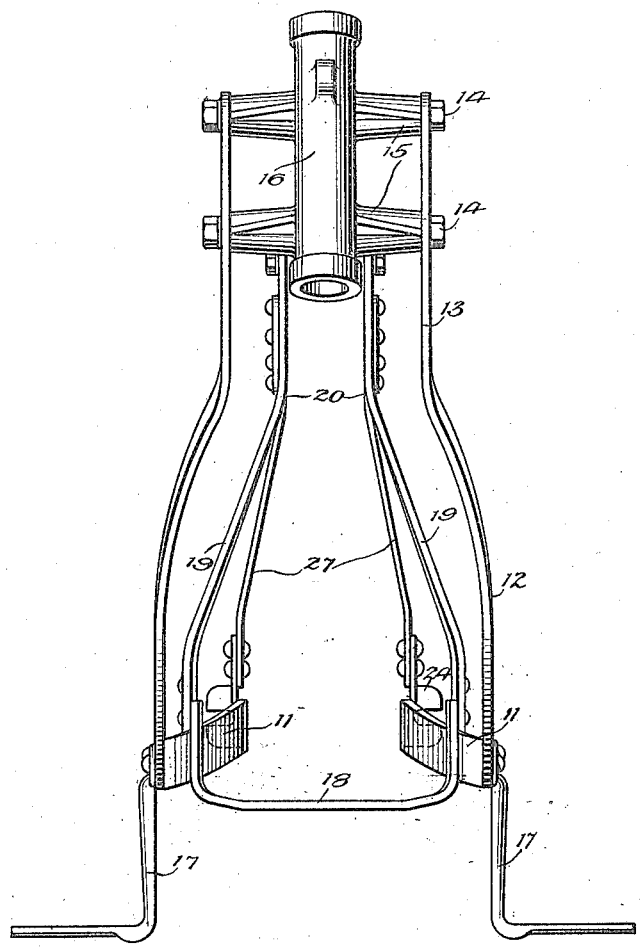

Patented Oct. 14, 1924.

1,511,631

UNITED STATES PATENT OFFICE.

VICTOR W. PAGÉ, OF STAMFORD, CONNECTICUT.

MOTOR-CYCLE FRAME.

Application filed December 26, 1922. Serial No. 609,007.

*To all whom it may concern:*

Be it known that I, VICTOR W. PAGÉ, a citizen of the United States, and a resident of Stamford, in the county of Fairfield and State of Connecticut, have invented a new and Improved Motor-Cycle Frame, of which the following is a full, clear, and exact description.

The present invention relates to new and useful improvements in motor cycles, and it pertains more particularly to frames therefor.

It is one of the objects of the invention to provide a frame for motor cycles which will be simple in construction, inexpensive to manufacture, and efficient for the purpose intended.

It is a further object of the invention to provide a frame for motor cycles in which all heat-made joints, such as those made by welding and brazing, are eliminated.

It is a further object of the invention to construct a frame for motor cycles of rolled members in lieu of tubular members such as commonly employed.

It is a further object of the invention to provide a motor cycle frame in which the several parts are readily removable to facilitate their replacement in case of breakage.

With the above and other objects in view, reference is had to the accompanying drawings, in which—

Figure 1 is a top plan view of a frame constructed in accordance with the present invention;

Fig. 2 is a view in side elevation thereof;

Fig. 3 is a view in front elevation thereof.

Referring more particularly to the drawings, the frame comprises two side members 11 of similar construction and arranged in parallelism. Each of these side members 11 is provided at its forward end with an upwardly projected portion 12 terminating in a substantially straight portion 13. The upper ends of these two members are secured together by means of a plurality of bolts 14, said bolts passing through lugs 15, which in turn form a part of the steering head 16.

Each of the side members 11 is provided on its outer face with a plurality of brackets 17, and said brackets 17 form the means for supporting a run-board in position on opposite sides of the frame. By reference to Fig. 3, it will be seen that the side members 11 are connected together near their rear ends by a U-shaped brace or the like, 18, and extending upwardly from each end of said brace is a pair of vertically-disposed members 19, the upper ends of which are bent inwardly as at 20. The ends of the brace 18 and each member 19 are tied to their respective side member 11, by means of a plate or similar reinforcing element 19′.

The reference character 21 designates a seat-post cluster, and said seat-post cluster is formed with oppositely-disposed lugs 22 adapted to receive the upper ends of the members 19, each of said upper ends being secured to its respective lug by means of bolts or the like, 23.

The rear end of each of the side members is bent inwardly of the frame and has connected thereto a rear wheel mount 24. The forward end of each of these rear mounts 24 has forwardly-projecting wings 25, by means of which the mounts are secured to their respective side frames. These rear wheel mounts also have forwardly and upwardly-projecting wings 26, and connected to each of the wings 26 is a brace 27, the upper end of each of which is secured to its respective member 19 by means of a plate, 28.

While in the present instance the permanently secured parts have been shown as being secured together by rivets, it is obvious that bolts or other suitable fastening means may be employed, and the fastening means is therefore not limited to rivets or similar permanent fastenings.

From the foregoing it is apparent that the present invention provides a frame for motor cycles and similar vehicles in which the several elements may be rigidly secured together without forming an integral structure as is the common practice, thus greatly facilitating the renewal or repair of parts over the old method of brazing or welding.

What is claimed is:

A motor cycle frame comprising a pair of side members arranged in parallelism, each of said members having a forwardly and upwardly-projecting forward end, a steering head secured to the forward ends of said members, run-board brackets carried by each of said members, a U-shaped brace connecting said members together adjacent their rear ends, vertically-extending members secured to the side members and to the U-shaped brace, the upper ends of said vertically extending members converging toward each other, a seat-post cluster secured between the upper end of said vertically extending members, and a rearwardly extending brace connected to each of said vertically extending members at its forward end and at the rear end to the rear end of its respective side member.

VICTOR W. PAGÉ.